(12) United States Patent
Takizawa et al.

(10) Patent No.: US 7,333,879 B2
(45) Date of Patent: Feb. 19, 2008

(54) OFFLINE PROGRAMMING DEVICE

(75) Inventors: Katsutoshi Takizawa, Tokyo (JP);
Yoshiharu Nagatsuka, Yamanashi (JP);
Hirohiko Kobayashi, Fujiyoshida (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/638,471

(22) Filed: Dec. 14, 2006

(65) Prior Publication Data
US 2007/0142973 A1 Jun. 21, 2007

(30) Foreign Application Priority Data
Dec. 16, 2005 (JP) .............................. 2005-363231

(51) Int. Cl.
*G05B 19/00* (2006.01)
(52) U.S. Cl. .................. 700/259; 700/245; 700/256; 700/247; 700/249; 700/253; 345/1.2; 345/158; 345/161; 345/169; 345/2.1; 368/680; 368/683; 219/121.63; 219/121.64; 318/568.1; 318/568.11; 318/568.12; 318/568.13; 318/568.19; 901/1; 901/3; 901/6; 901/15; 901/49
(58) Field of Classification Search ............... 700/245, 700/256, 247, 253, 249, 259; 219/121.63, 219/121.64; 318/568.1, 568.11, 568.12, 318/568.13, 568.19, 568.21, 568.22, 567, 318/563, 625, 568.2; 901/2, 8, 9, 16, 23
See application file for complete search history.

(56) References Cited

U.S. PATENT DOCUMENTS

| | | | | |
|---|---|---|---|---|
| 4,517,652 A | * | 5/1985 | Bennett et al. | 700/264 |
| 4,761,745 A | * | 8/1988 | Kodaira | 700/254 |
| 5,495,410 A | * | 2/1996 | Graf | 700/86 |
| 5,798,627 A | * | 8/1998 | Gilliland et al. | 318/568.14 |
| 5,880,956 A | * | 3/1999 | Graf | 700/86 |
| 6,330,495 B1 | * | 12/2001 | Kaneko et al. | 700/264 |
| 6,332,102 B1 | * | 12/2001 | Nakajima et al. | 700/245 |
| 6,356,806 B1 | * | 3/2002 | Grob et al. | 700/245 |
| 6,509,576 B2 | * | 1/2003 | Woo-Dong | 250/559.33 |
| 6,522,949 B1 | * | 2/2003 | Ikeda et al. | 700/245 |
| 6,597,971 B2 | * | 7/2003 | Kanno | 700/245 |
| 6,836,700 B2 | * | 12/2004 | Greene et al. | 700/245 |
| 6,853,881 B2 | * | 2/2005 | Watanabe et al. | 700/264 |

FOREIGN PATENT DOCUMENTS

JP      2767417      4/1998

\* cited by examiner

*Primary Examiner*—Thomas Black
*Assistant Examiner*—McDieunel Marc
(74) *Attorney, Agent, or Firm*—Drinker Biddle & Reath LLP

(57) ABSTRACT

An offline programming device capable of automatically generating a measuring program by which the time and the workload for making an offline program may be greatly reduced. The offline programming device includes a storing part for storing a plurality of data in relation to a plurality of measurement points of the object and the position and the orientation of a vision sensor relative to the movable part of the robot; a calculating part for calculating the position and the orientation of the vision sensor relative to each measurement point when the measurement point is measured; a measuring program making part for making at least one measuring program, based on the plurality of data stored in the storing part, by means of which the position and the orientation of the vision sensor may be achieved; an evaluating part for evaluating the at least one measuring program according to a predetermined evaluative criteria; and a selecting part for selecting a measuring program, from the at least one measuring program, which satisfies the predetermined evaluative criteria.

5 Claims, 7 Drawing Sheets

OFFLINE PROGRAMMING DEVICE

RELATED APPLICATIONS

The present application claims priority from Japanese Patent Application No. 2005-363231, filed on Dec. 16, 2005, the entire content of which is fully incorporated herein by reference.

BACKGROUND OF THE INVENTION

1. Field of the Invention

The present invention relates to an offline programming device and, in particular, to an offline programming device for easily correcting the difference between an offline simulation and a field operation, in relation to the position of a robot relative to an object.

2. Description of the Related Art

When an object to be worked or a workpiece should be worked using a robot, in the prior art, the positional relation between the robot and the workpiece is calculated offline by using CAD or CAM Systems. However, as this method can determine only a rough layout of the robot, the method is not suitable when high positional accuracy is required, for example, in the case of spot welding.

To that end, for example, Japanese Patent Publication No. 2,767,417 discloses a control device for measuring the accurate position of a workpiece by means of a camera mounted on a robot. In detail, the control device may image three reference points on the workpiece by using the camera so as to calculate the three-dimensional positional relation between the robot and the workpiece. Due to the calculated result, the positional relation previously obtained offline may be corrected so as to improve the positional accuracy.

The accuracy of the positional relation between the robot and the workpiece may be improved by correction using a camera or a vision sensor. However, a measuring program for imaging the reference point of the workpiece using the vision sensor is created, by an operator, by trial and error, as in the case of conventional programming. Therefore, it takes time to create an offline program including the measuring program. Further, if an operation check of the offline program is not adequately or sufficiently carried out, the robot may interfere with the workpiece in this field. It also takes time to avoid this interference.

SUMMARY OF THE INVENTION

Accordingly, an object of the present invention is to provide an offline programming device capable of automatically making a measuring program and significantly reducing the time and the workload for creating the program.

Concretely, according to the present invention, there is provided an offline programming device for making a measuring program for measuring an object to be worked by using at least one vision sensor mounted on a movable part of a robot, in order to correct the positional relation between the robot and the object in an offline simulation based on the measured positional relation between the robot and the object in the field, the offline programming device comprising: a storing part for storing a plurality of data in relation to a plurality of measurement points of the object and the position and the orientation of the vision sensor relative to the movable part of the robot; a calculating part for calculating the position and the orientation of the vision sensor relative to each measurement point when the measurement point is measured; a measuring program making part for making at least one measuring program, based on the plurality of data stored in the storing part, by means of which the position and the orientation of the vision sensor may be achieved; an evaluating part for evaluating the at least one measuring program according to a predetermined evaluative criteria; and a selecting part for selecting a measuring program, from the at least one measuring programs, which satisfies the predetermined evaluative criteria.

Concretely, the predetermined evaluative criteria may be whether the operating range of the robot determined in the measuring program is within the whole operating range of the robot determined in an operation program of the robot.

Alternatively or additionally, the predetermined evaluative criteria may be whether at least one of a work tool mounted on the movable part of the robot, the vision sensor and a modeled scope representing a viewing field of the vision sensor interfere with another object or external equipment.

Alternatively or additionally, the predetermined evaluative criteria may include an angle formed by a surface on which the measuring point is positioned and a view line of the vision sensor directed to the measuring point.

In the invention, the robot may be a spot welding robot. In this case, the predetermined evaluative criteria may include the degree of the difference between the orientation of the robot during measuring and the orientation of the robot during spot welding.

BRIEF DESCRIPTION OF THE DRAWINGS

The above and other objects, features and advantages of the present invention will be made more apparent by the following description of the preferred embodiments thereof, with reference to the accompanying drawings, wherein:

FIG. 6b shows a display example in which the robot is somewhat shifted from the state of FIG. 6a.

DETAILED DESCRIPTION

Figure 1:
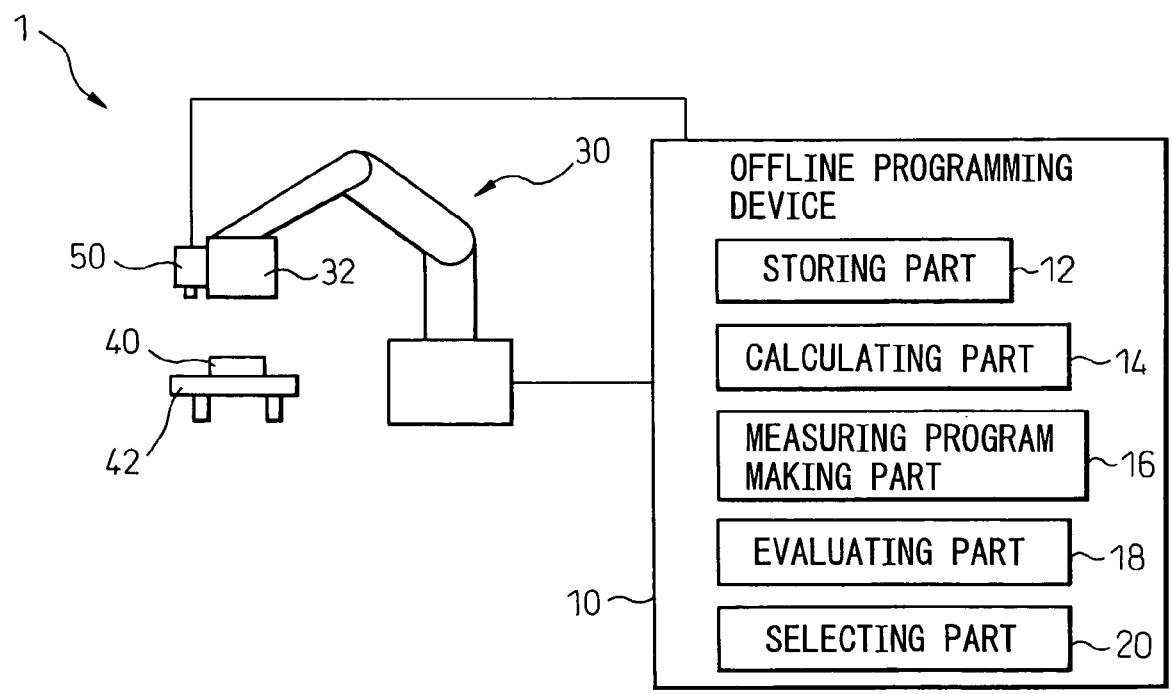
FIG. 1 is a diagram showing a basic configuration of a robot system including an offline programming device according to the invention.

The present invention will be described below with reference to the drawings. FIG. 1 is a diagram showing a basic configuration of a robot system 1 including an offline programming device 10 according to the invention. The robot system 1 includes a robot 30 having a hand 32 provided with a work tool (not shown) acting on an object to be worked or a workpiece 40 supported by a jig 42 such as a work table. The robot 30 has at least one vision sensor or camera 50 mounted thereon for measuring reference points on the workpiece 40 or the work table 42, as described below. A measuring program, in which the camera 50 is used, is made by an offline programming device 10 included in the system 1. In fact, the offline programming device 10 may be contained in a personal computer having a display and an operator may input various data via a keyboard or the like.

The offline programming device 10 is used for making a program for measuring the workpiece or the work table by means of the camera 50 mounted on a movable part such as the hand 32 of the robot 30, so as to correct the positional relation between the robot 30 and the workpiece 40 in an offline simulation, based on the actual positional relation between them measured by the camera 50. The offline programming device 10 includes: a storing part 12 for storing a plurality of data in relation to a plurality of measurement points (or reference points) on the work table 40 and the position and the orientation of the camera 50 relative to the hand 32; a calculating part 14 for calculating the position and the orientation of the camera relative to each measurement point when the measurement point is measured; a measuring program making part 16 for making at least one measuring program, based on the plurality of data stored in the storing part 12, by means of which the position and the orientation of the camera 50 may be achieved; an evaluating part 18 for evaluating the at least one measuring program according to a predetermined evaluative criteria (described below); and a selecting part 20 for selecting a measuring program, from the at least one measuring program, which satisfies the predetermined evaluative criteria.

Figure 2:
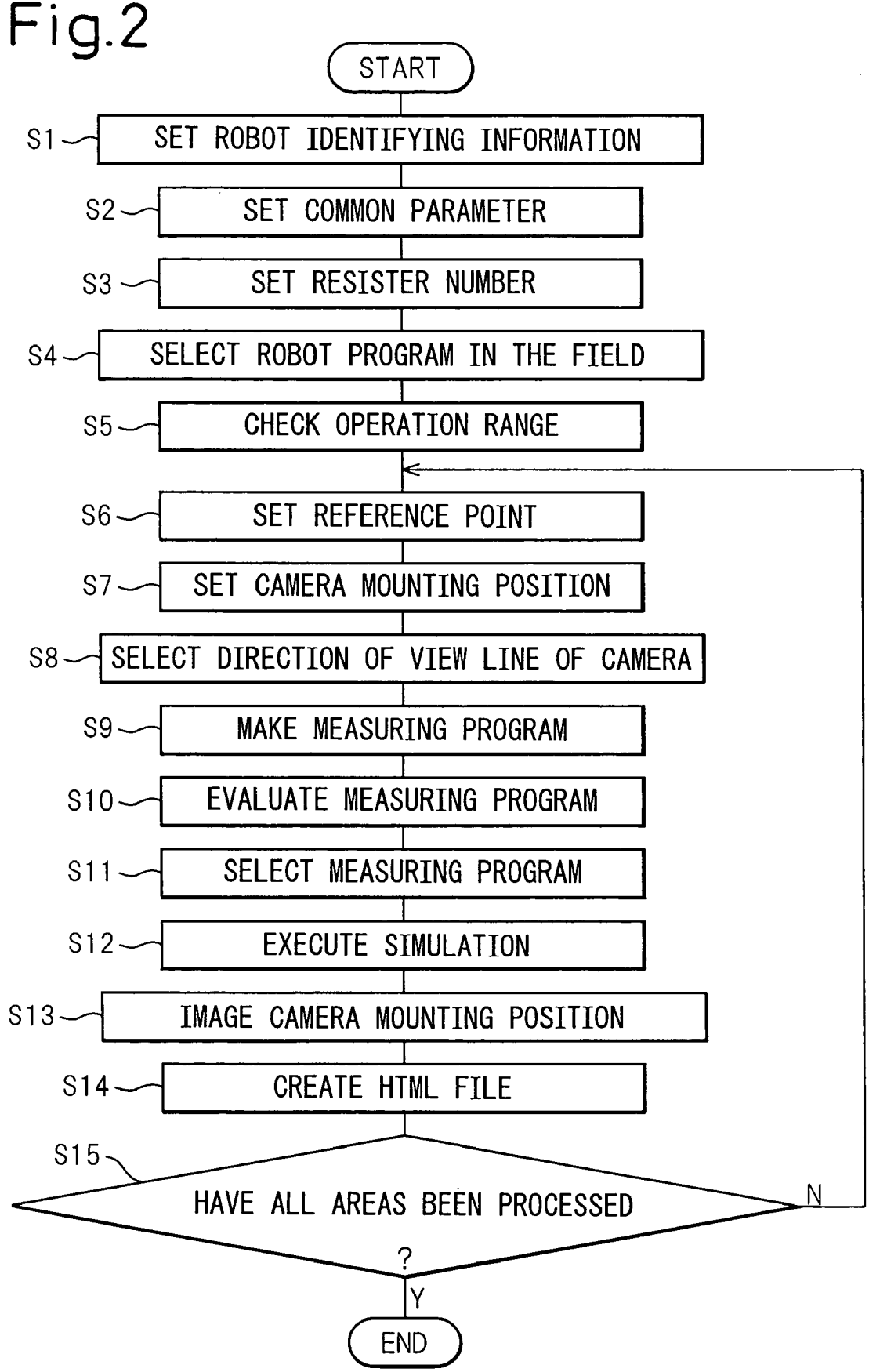
FIG. 2 is a flowchart showing a process by the offline programming device.
Figure 3:
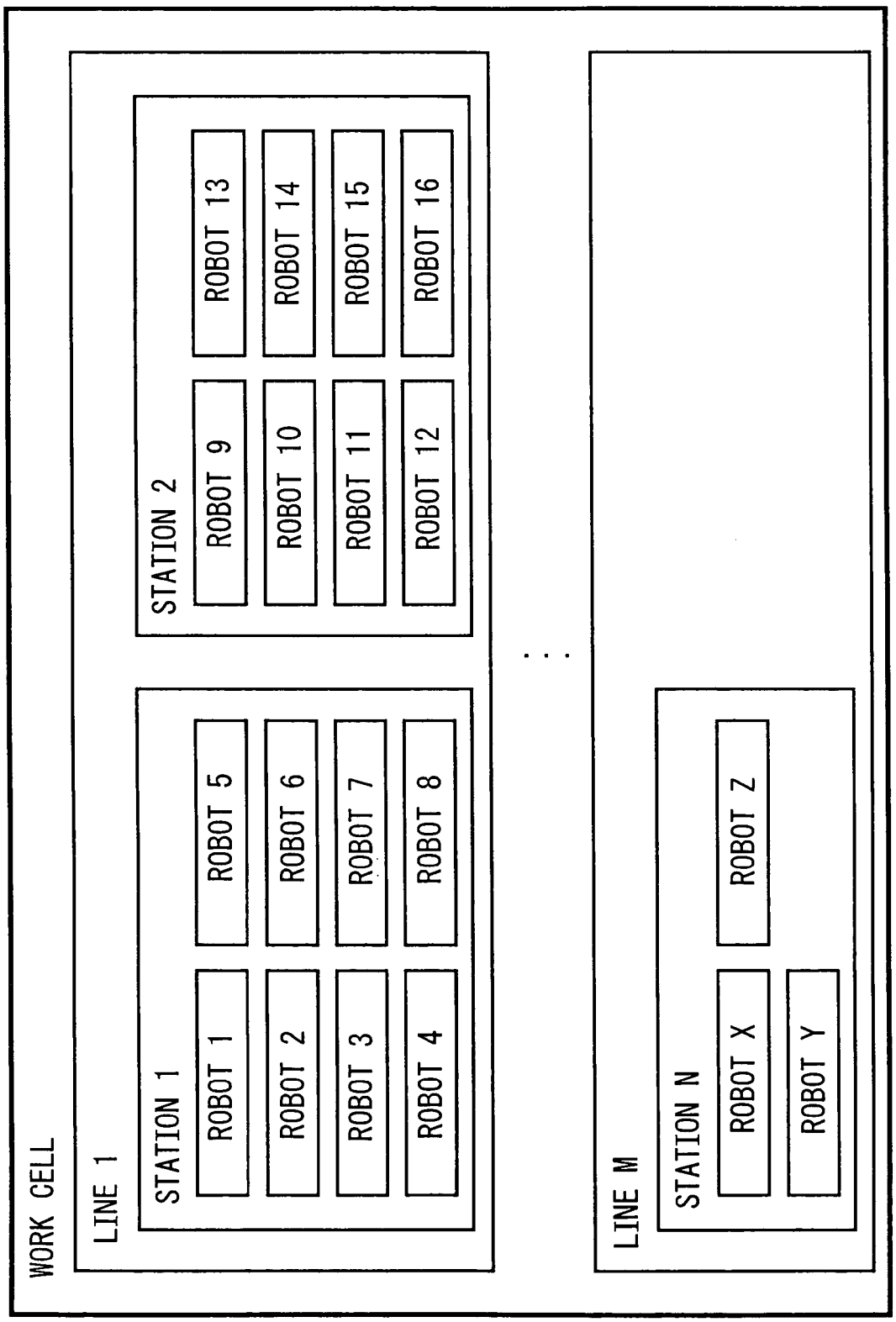
FIG. 3 shows a display example of robot identifying information.

FIG. 2 is a flowchart showing a process by the offline programming device 10. First, in step S1, robot identifying information is set for identifying and managing a program to be made. As an example of the robot identifying information, names of a plurality of process lines, a name of a station in each process line, and a name of a robot of the station, etc., may be used. The operator may directly input such names to the personal computer or, alternatively, may select such names in a wizard window displayed on the display of the computer. The names of the line, the station and/or the robot thus set may be classified and displayed on the display of the computer, as shown in FIG. 3.

Then, in step S2, parameters common to the whole operation, such as a number of a tool coordinate, a register number storing the measured result by the camera and the number of areas measured by the camera, etc., are set. In this specification, the "areas" may be set on each workpiece and each area may include some measuring points or reference points on the workpiece or a jig supporting the workpiece. This operation may also be executed using a wizard window displayed on the display of the computer.

Next, in step S3, the register number, for storing the position of the reference points of the workpiece to be measured by the camera, is set. In the embodiment, a register for storing positional information of three reference points on each area set in step S2.

In the next step S4, a robot program to be used in the field is selected. The robot program in the field may be selected corresponding to the application thereof. For example, the robot program may be previously contained in the personal computer or, otherwise, may be downloaded from another computer or a database via a suitable communication means.

Then, in step S5, an operating range of the selected robot program in the field is checked. In the embodiment, the robot program is executed in a system such as "ROBPGUIDE (™)" and each axis of the robot (for example, axes J1-J6) is simulated so as to calculate the moving range of each axis. The calculated moving ranges may be displayed in relation to each axis. The operating range thus obtained is used for checking an operating area of a program for measuring the reference points as described below. In other words, it is checked whether the operating range of the measuring program is within the operating range of the robot program in the field.

Figure 4:
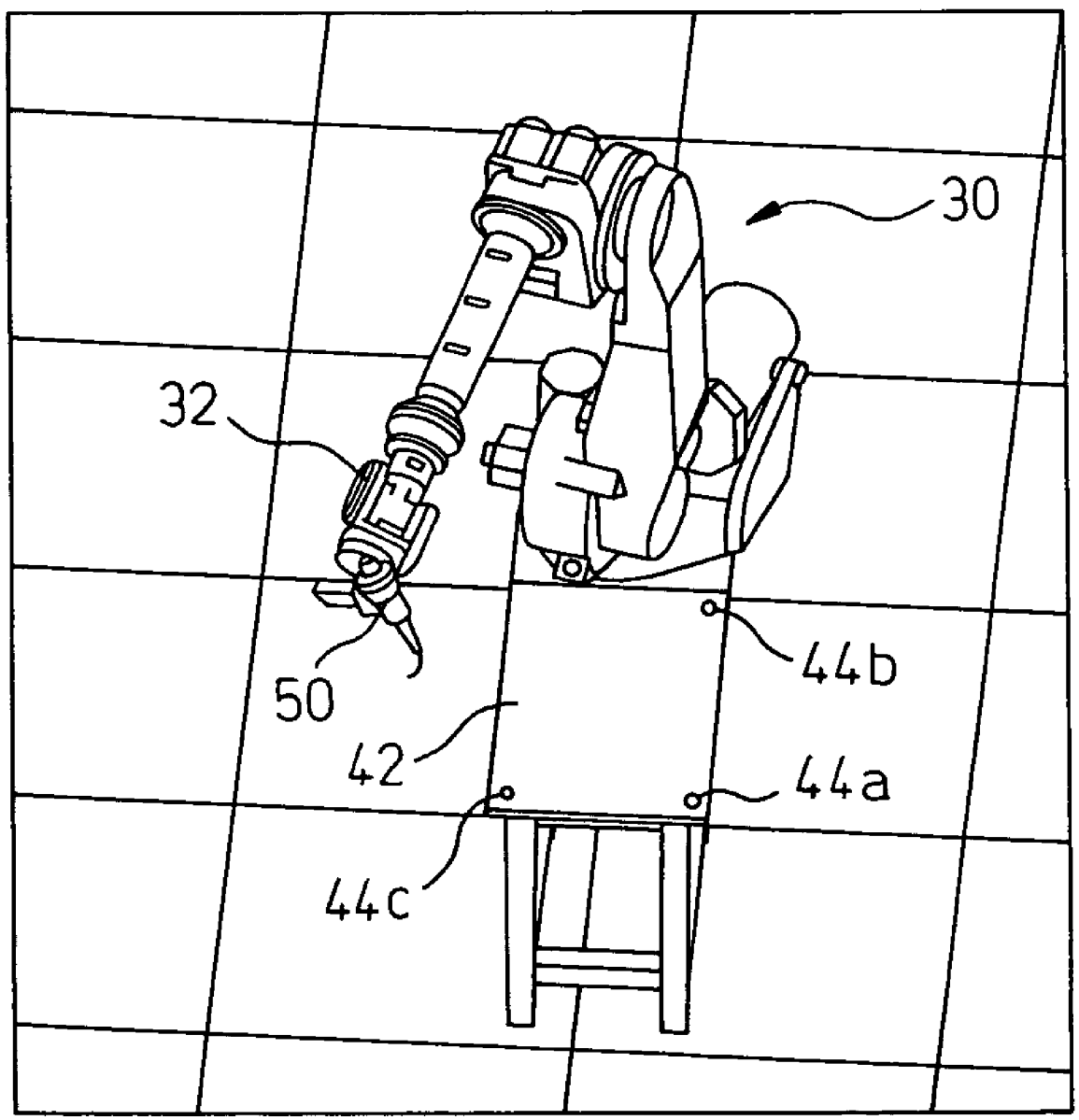
FIG. 4 shows a display example of a robot and an object to be worked.

In following steps S6 to S14, the measuring program is made and various parameters are set, in relation to each area set in step S2. First, in step S6, coordinates of three reference points in one area are set. These coordinates may be directly inputted in the offline programming device by the operator or, otherwise, may be visually pointed in the display as shown in FIG. 4, by a mouse click motion or the like. FIG. 4 shows the state in which three references 44a, 44b and 44c are set on a work table 42 for supporting a workpiece (not shown) handled by the robot 30.

Next, in step S7, the mounting position or coordinate of the camera in the offline programming device is set. These coordinates may also be directly inputted in the offline programming device by the operator or, otherwise, may be pointed to on the display as shown in FIG. 4, by a mouse click motion or the like. FIG. 4 shows an example of the state in which the camera 50 is mounted on the end of the movable part or the hand 32 of the robot.

Figure 5A:
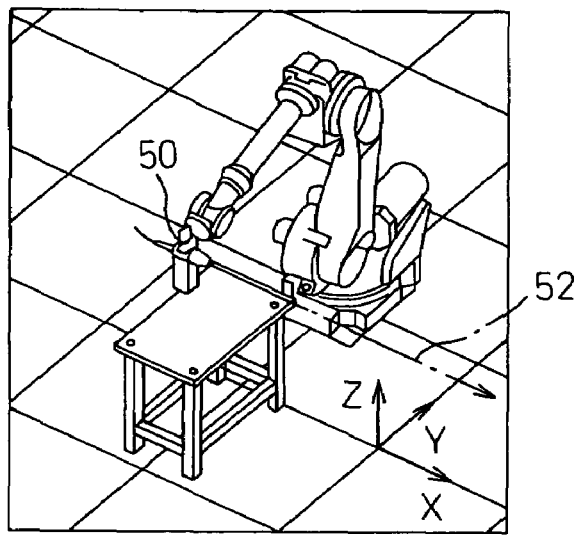
FIGS. 5a, 5b and 5c show display examples in which a camera is mounted on the robot such that a view line of the camera is parallel to the X-axis, Y-axis and Z-axis, respectively.
Figure 5B:
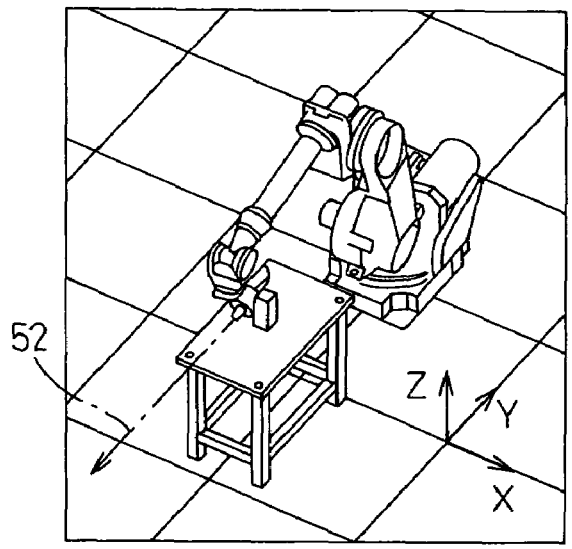
Figure 5C:
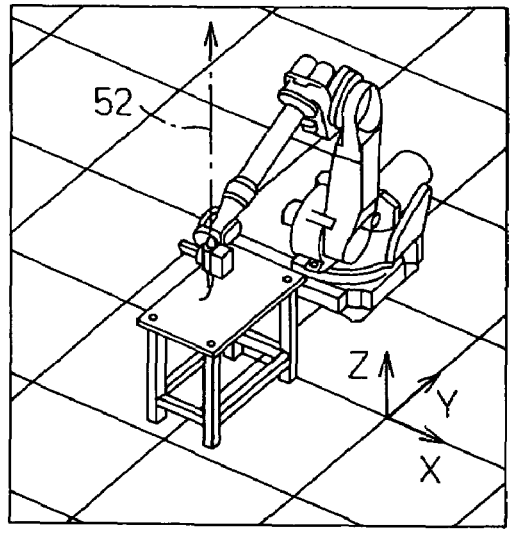

In the next step S8, the direction of a view line of the camera 50 mounted in step S7 is determined. Although the direction may be determined in any direction, it is generally unknown which direction is the most suitable for measuring at this moment. Therefore, the directions of major axes of the tool coordinate (i.e., six directions including +X, −X, +Y, −Y, +Z and −Z directions) are firstly selected as primary alternatives and stored in the storing part 12. At this point, FIGS. 5a to 5c are examples of the states in which the camera 50 is mounted such that the view line 52 of the camera 50 is parallel to X, Y and Z axes, respectively.

Then, in step S9, a program for measuring the reference points is made. In this step, a constraint condition, such as the direction in which the three-dimensional or stereo measuring, and/or the direction and the angle of inclination of the hand when the hand must be inclined so as to avoid interference, may be previously inputted. According to such a condition and data of the alternatives stored in the storing part 12, the calculating part 14 calculates the position of the orientation of the camera 50 when the camera measures each measurement point. Then, the measuring program making part 16 makes a measuring program, by which the camera can present the calculated position and the orientation, in relation to each direction of the view line (or generally, +X, −X, +Y, −Y, +Z and −Z directions).

Figure 6A:
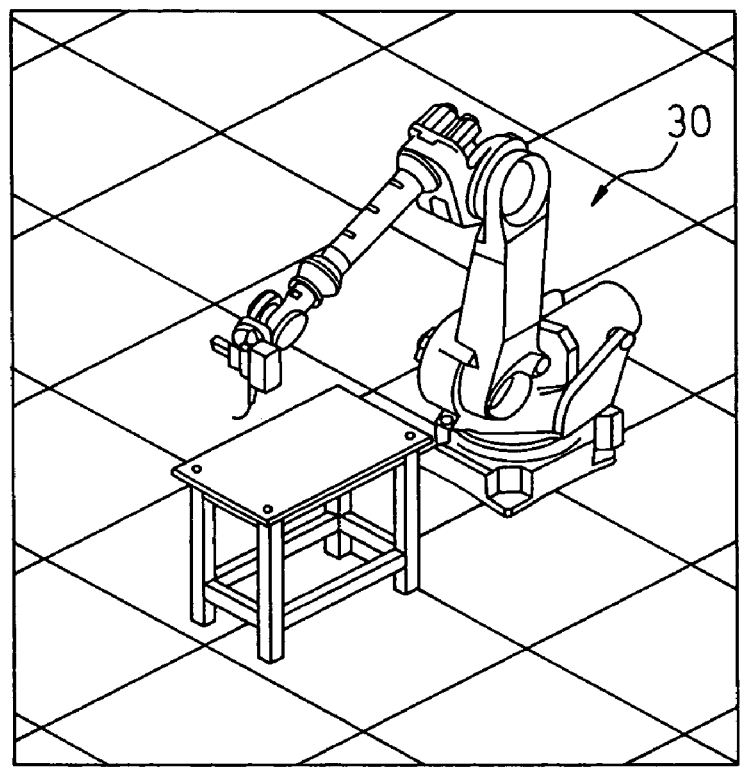
FIG. 6a shows a display example indicating the positional relation between the robot and the object to be worked.
Figure 6B:
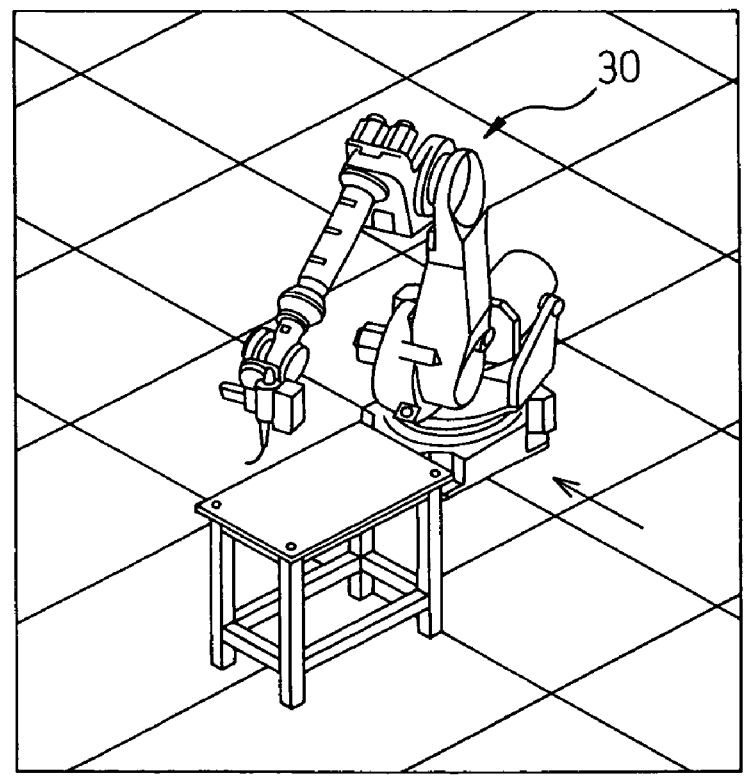

Next, in step S10, each measuring program made in step S9 is evaluated. In this step, the operation of each program is checked in relation to the following points:

(i) whether the operating range of the measuring program is within the operating range of the robot program in the field (ii) whether the robot will interfere with another object (iii) whether an obstacle is positioned on the view line of the camera (iv) the above items (i)-(iii) are checked, taking into account an expected error such as a positional error of the robot In relation to the item (iii), first, a modeled scope representing the range of the camera, such as a cylinder, a cone or a pyramid an axis of which coincides with the view line of the camera, is assumed. Then, it is checked whether an obstacle, which may interfere with the modeled scope, is present or not. In relation to the item (iv), the robot is moved and positioned at some positions which are away from the previous position by a certain distance (for example, the distance equal to or somewhat longer than the expected error). For example, the robot is moved from the position of FIG. 6a to the position of FIG. 6b. Then, a measuring program is made in relation to each position and the operation range thereof is checked.

After checking the operation range of each measuring program, the operator selects the program to be used (in step S11). As the personal computer may display the result evaluated in the device (for example, the volume of corrected data and/or the presence of absence of a relay point in the moving path of the robot) based on the above items (i) to (iv), the operator can easily find the optimum program. As the other preferable evaluative criteria, an angle, formed by a surface on which the measuring point is positioned and the view line of the camera directed to the measuring point, may be used. The nearer to the perpendicular this angle is, the more accurately the reference point may be measured. Further, when the robot is a spot welding robot capable of spot welding a vehicle body or the like, the reference point is generally positioned on or near a welding point. Therefore, among the orientations of the robot when measuring the reference point, one orientation, which is the most similar to the orientation when carrying out spot welding, may be selected as the most optimum orientation. In other words, a preferable program has the smaller degree of the difference between the orientation of the robot during measuring and the orientation of the robot during spot welding.

In the next step S12, the selected measuring program is simulated. Concretely, when the robot reaches each reference point, the camera mounted on the robot images each reference point. When it is confirmed that all reference point may be suitably imaged, the measuring program is determined as a measuring program to be used.

Figure 7:
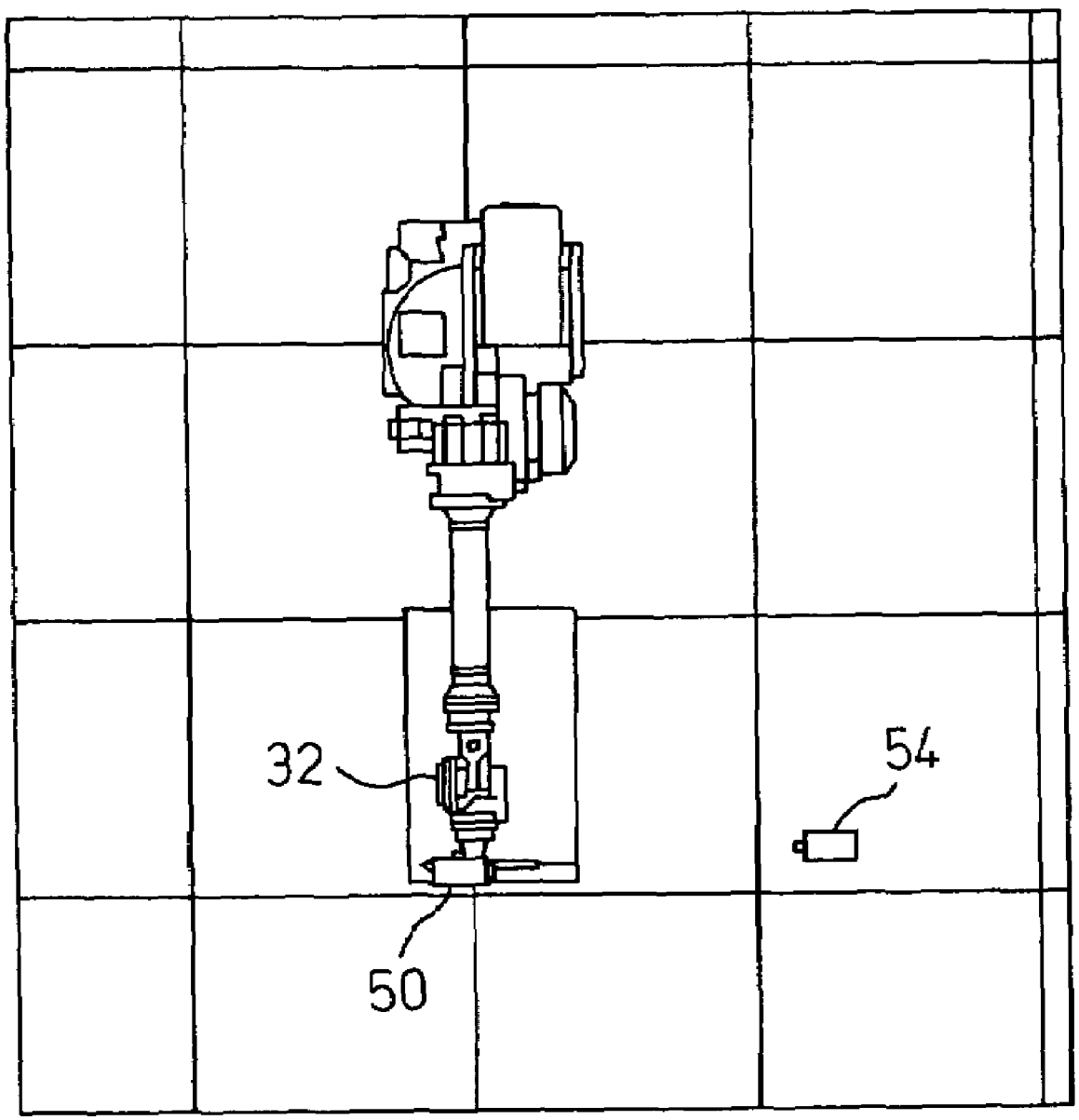
FIG. 7 shows a display example indicating another camera for imaging the camera mounted on the robot.

Next, in step S13, as shown in FIG. 7, a virtual camera 52 is arranged in the work cell in the offline programming device, so as to image the condition of the camera 50 mounted on the end of the hand 32 in such a manner as directed in the determined measuring program. Due to an image obtained by the camera 54, the operator can understand how the camera should be mounted on the end of the hand in the field. At this point, the camera 54 preferably images the camera 50 from four directions, whereby plan, side, front and back views of the camera 50 may be obtained.

Optionally, in step S14, the image may be generated as a HTML file, whereby the operator may check the condition of the camera mounted on the robot in the generated program by the offline programming device of the invention from another computer or the like.

Finally, in step S15, it is judged whether the processes from step S6 to S14 have been completed in all areas. If the processes have been completed, the operation is terminated.

According to the offline programming device of the invention, a measuring program having no problem may be automatically generated in a short time. Therefore, it is unnecessary to teach or correct the program in the field through trial and error, whereby the adjusting time for the program may be greatly reduced. Further, by means of various evaluative criteria regarding the measuring program, the optimum program may be made without depending on the skill of an operator.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. An offline programming device for making a measuring program for measuring an object to be worked by using at least one vision sensor mounted on a movable part of a robot, in order to correct the positional relation between the robot and the object in an offline simulation based on the measured positional relation between the robot and the object in the field, the offline programming device comprising:
    a storing part for storing a plurality of data in relation to a plurality of measurement points of the object and the position and the orientation of the vision sensor relative to the movable part of the robot;
    a calculating part for calculating the position and the orientation of the vision sensor relative to each measurement point when the measurement point is measured;
    a measuring program making part for making at least one measuring program, based on the plurality of data stored in the storing part, by means of which the position and the orientation of the vision sensor may be achieved;
    an evaluating part for evaluating the at least one measuring program according to a predetermined evaluative criteria; and
    a selecting part for selecting a measuring program, from the at least one measuring program, which satisfies the predetermined evaluative criteria.

2. The offline programming device as set forth in claim 1, wherein the predetermined evaluative criteria is whether the operating range of the robot determined in the measuring program is within the whole operating range of the robot determined in an operation program of the robot.

3. The offline programming device as set forth in claim 1, wherein the predetermined evaluative criteria is whether at least one of a work tool mounted on the movable part of the robot, the vision sensor and a modeled scope representing a viewing field of the vision sensor interfere with another object or external equipment.

4. The offline programming device as set forth in claim 1, wherein the predetermined evaluative criteria includes an angle formed by a surface on which the measuring point is positioned and a view line of the vision sensor directed to the measuring point.

5. The offline programming device as set forth in claim 1, wherein the robot is a spot welding robot and the predetermined evaluative criteria includes the degree of the difference between the orientation of the robot during measuring and the orientation of the robot during spot welding.

* * * * *